Nov. 29, 1949     F. T. HARRINGTON     2,489,411
COMBINED POWER TRANSMISSION SYSTEM, LANDING GEAR
RETRACTING MOTOR, AND WHEEL PREROTATING
AND BRAKING DEVICE FOR AIRCRAFT
Filed March 29, 1947
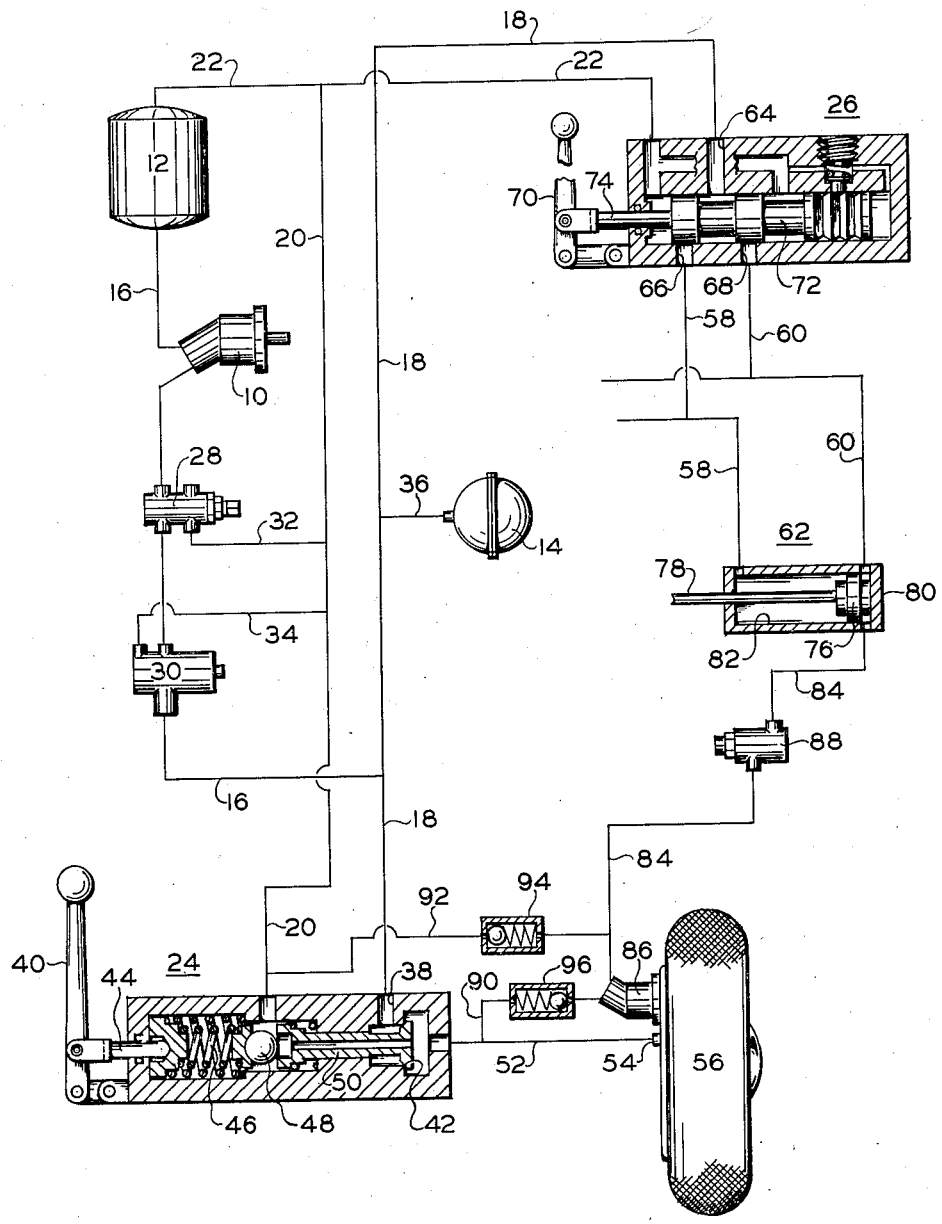
*INVENTOR.*
FERRIS T. HARRINGTON
BY *Ralph L. Tweedale*
ATTORNEY Patented Nov. 29, 1949

2,489,411

UNITED STATES PATENT OFFICE 2,489,411

COMBINED POWER TRANSMISSION SYSTEM, LANDING GEAR RETRACTING MOTOR, AND WHEEL PREROTATING AND BRAKING DEVICE FOR AIRCRAFT

Ferris T. Harrington, Detroit, Mich., assignor to Vickers Incorporated, Detroit, Mich., a corporation of Michigan Application March 29, 1947, Serial No. 738,239

14 Claims. (Cl. 244—103)

This invention relates to power transmissions, particularly to those of the type comprising two or more fluid pressure energy translating devices, one of which may function as a pump and another as a fluid motor.

The invention is more particularly concerned with a hydraulic power transmission for pre-rotating the landing wheels of an aircraft prior to landing and for applying the brakes for the wheels after landing.

In the present invention a system for pre-rotating the wheels is employed in combination with the braking system. Although the invention is incorporated for the purposes of convenience in a hydraulic power transmission for retracting and extending the landing gear of aircraft, it may be installed in the transmission so as to be entirely independent of the landing gear retraction and extension system. The complete transmission may be designed so that the wheels will be rotated only after the landing gear has been lowered into operable position. In addition, the wheel rotation motor is connected to a brake valve and brake cylinder in such a manner that in addition to operating as a motor to pre-rotate the wheels prior to landing, it also operates as a pump to supply pressure fluid to the brake cylinder for operating the wheel brake under the control of the brake valve. The system is also designed in such a manner that the brake valve and brake cylinder operate in the conventional manner for applying the brakes when parking the aircraft.

It is, therefore, an object of this invention to provide a combined hydraulic braking and landing gear wheel pre-rotation system.

It is also an object to provide a fluid motor for pre-rotating an aircraft landing wheel prior to landing combined with a conventional hydraulic braking system in such a manner that the fluid motor will operate as a pump to supply braking pressure fluid to the brake cylinders after landing.

It is still another object to provide a hydraulic system incorporating a fluid motor for pre-rotating the landing wheel of an aircraft prior to landing in which provision has been made for completely exhausting the fluid displacement of the motor while pre-rotating the wheels and for controlling the displacement therefrom upon landing for operating the brakes of the aircraft.

Summarily, the broad object of this invention is to provide a combined braking and landing gear wheel pre-rotation system.

Further objects and advantages of the present invention will be apparent from the following description, reference being had to the accompanying drawing wherein a preferred form of the present invention is clearly shown.

In the drawing the single figure is a schematic diagram of an aircraft landing gear control system embodying a preferred form of the present invention.

A pressure fluid source of supply is provided by a pump 10, a tank 12, and accumulator 14 connected by pressure conduits 16 and 18 and tank conduits 20 and 22 to the brake valve 24 and landing gear control valve 26. A relief valve 28 and an unloading valve 30 are located in pressure conduits 16 and are provided with tank lines 32 and 34, respectively, extending to tank conduit 20. The accumulator 14 is connected by conduit 36 to pressure conduit 18.

The brake valve 24 is of standard construction wherein operating fluid enters at connection 38. The operating lever or panel 40 is linked to the actual valve and seat 42 through link 44, spring 46, the ball of discharge valve 48 and hollow valve element 50. For parking purposes, actuating the lever 40 moves valve element 50 off its seat 42 thus connecting the pressure conduit 18 to the brake conduit 52 and brake device 54 mounted on landing wheel 56.

With valve 24 in the position shown, pressure fluid flowing leftwardly in conduit 52 is freely exhausted to the tank 12 through the valve 50 and conduit 20 because of valve 48 being completely unseated. However, if the flow of fluid in the conduit 52 towards the valve 24 is continuous, and if the lever 40 is actuated, the valve 48 is moved toward the closed position to immediately cause a restricted opening. The valve 48 will remain slightly unseated due to the pressure response increase in conduit 52 and the valve 50 will remain seated. Further movement of the lever 40 tends to further restrict the opening causing an increase in pressure while movement towards the left of the lever 40 will increase the size of the restriction to decrease the pressure in conduit 52.

The landing gear valve 26 is connected by pressure and return conduits 58 and 60 to motor 62. Valve 26 is of the closed center type wherein the pressure connection 64 is blocked in neutral or selectively connected to cylinder ports 66 or 68 by means of operating lever 70 actuating spool valve 72 through link 74. In practice, the piston 76 and rod 78 of landing gear motor 62 are connected to the retractable frame supporting the landing wheel 56.

Movement of piston 76 to the left would lower the landing gear into position for landing. To accomplish this, pressure fluid would be directed through conduit 60 into the head end 80 of cylinder 82. A pressure conduit 84 leads from the head end 80 of cylinder 82 to the inlet port of the pre-rotating motor 86. A sequence valve 88 which may be either of the pressure responsive or mechanically actuated type is located in the conduit 84 and is adapted to block the flow through conduit 84 until the landing gear is completely extended. A conduit 90 connects the outlet port of pre-rotation motor 86 to the brake conduit 52. An auxiliary supply conduit 92 connects the tank line 20 to the inlet of pre-rotation motor 86. A check valve 94 located in conduit 92 prevents pressure fluid bypassing from conduit 84 to tank conduit 20. A check valve 96 located in conduit 90 prevents pressure fluid from the brake conduit 52 entering the motor 86.

In operation, the pump 10 is driven by a prime mover (not shown) and directs pressure fluid through conduits 16 and 18 to connection 64 of landing gear valve 26. By shifting operating lever 70 to the right, pressure fluid is directed from connection 64 to cylinder port 68 and thence by conduit 60 to the head end 80 of landing gear motor cylinder 82.

Thus, the pressure is exerted against the piston 76 and is blocked in conduit 84 by sequence valve 88. When piston 76 reaches the left end of cylinder 82, the sequence valve 88 is actuated to direct pressure fluid to the pre-rotation motor 86. Therefore, as soon as the landing gear is lowered to its operating position, the motor 86 will start the wheel 56 rotating.

The discharge from pre-rotation motor 86 is directed by conduit 90 to brake conduit 52 and thence through the hollow valve element 50 by ball valve 48 and tank conduit 20 to tank 12.

When the aircraft wheels are on the runway, the directional control valve 26 may be operated to shift the valve spool 72 to the neutral position shown. With the pressure fluid supply cut off from the motor 86, the latter automatically operates as a pump. The wheel 56 becomes the driving means for the motor 86 operating as a pump and the fluid supply is furnished by the auxiliary supply conduit 92. Displacement from the motor is returned to the tank 12 through the brake valve 24 and the conduit 20.

When the aircraft is landed, if the wheel 56 has not been pre-rotated to a maximum landing speed, the speed of the motor 86 will automatically be increased by the wheel 56 resulting in an increased fluid displacement of the motor 86. Consequently, the system is designed to handle the greatest volume displacement of the motor and in particular providing a conduit 52 and brake valve 24 capable of handling this assignment.

It should be understood, however, that the motor 86 and the pump 10 may be designed to cooperate together so as to provide a speed of rotation of the wheel 56 at least equal to its greatest landing speed.

If the lever 40 of the brake valve 24 is now operated the ball valve 48 moves towards the closed position causing a restriction which results in an immediate increase of pressure in the conduit 52 which maintains the valve 50 seated. The immediate pressure increase in the conduit 52 diverts a portion of the delivery of motor 86 to the brake cylinder 54 to apply the brake on the wheel 56, the remainder of the fluid being exhausted to the tank 12 through the ball valve 48.

It is important to note that the immediate pressure increase caused by the valve 48 creating a restricted opening creates a torque commensurate with this pressuer increase at the motor 86 by means of conduit 90 which the motor 86 must now overcome. Consequently, in addition to the actual braking power of the brake 54 the torque created at the motor 86 which the latter must overcome acts to create an additional braking force.

When the aircraft has been taxied to a parked position, the motor 86 will no longer be operative. The brake may be maintained in the on, or parked position, by maintaining the lever 40 to a rightwardly shifted position. With the motor 86 inoperative when the lever 40 is shifted rightwardly, the valve 50 is unseated and pressure fluid from conduit 18 will be admitted to the conduit 52 to actuate the brake cylinder 54. The check valve 96 prevents flow to the motor 86. The valve 50 will shift valve 48 against the resistance of the spring 46 when the brake cylinder 54 has been actuated. Valve 50 will seat to maintain the pressure trapped in conduit 52. Excessive pressure caused by temperature expansion in the line 52 may be relieved through the ball valve 48 to the tank 12.

It will thus be seen that the present invention is a hydraulic transmission for pre-rotating aircraft landing wheels prior to landing in combination with the braking system for the wheels.

It should also be noted that the braking system is used in combination with the pre-rotation motor for braking the wheels on landing, but that the braking system operates in the conventional manner for maintaining the aircraft in the parked position.

While the form of embodiment of the invention as herein disclosed constitutes a preferred form, it is to be understood that other forms might be adopted, all coming within the scope of the claims which follow.

What is claimed is as follows:

1. In combination with a hydraulic power transmission system for retracting and extending the landing wheel of an aircraft comprising means forming a source of pressure fluid including a tank and a fluid pump, a fluid motor for retracting and extending the landing wheel, and control valve means for selectively controlling the direction of operation of the motor, a fluid motor-pump unit connected in driving relation with the wheel, a fluid operated brake for the wheel, means for selectively connecting the pressure fluid source to the motor-pump unit for prerotating the wheel prior to landing of the aircraft, and means for selectively controlling the motor outlet for operating the wheel brake after landing.

2. In combination with a hydraulic power transmission system for retracting and extending the landing wheel of an aircraft comprising means forming a source of pressure fluid including a tank and a fluid pump, a fluid motor for retracting and extending the landing wheel, and control valve means for selectively controlling the direction of operation of the motor, a fluid motor-pump unit connected in driving relation with the wheel, a fluid operated brake for the wheel connected to the outlet of the motor-pump unit, means forming a by-pass for the motor outlet, means for selectively connecting the pressure fluid source to the motor-pump inlet for prerotating the wheel prior to landing of the aircraft, and means for selectively controlling the by-pass for operating the wheel brake after landing.

3. In combination with a hydraulic power transmission system for retracting and extending the landing wheel of an aircraft comprising means forming a source of pressure fluid including a tank and a fluid pump, a fluid motor for retracting and extending the landing wheel, and control valve means for selectively controlling the direction of operation of the motor, a fluid motor-pump unit connected in driving relation with the wheel, a fluid operated brake for the wheel connected to the outlet of the motor-pump unit, means for selectively connecting the pressure fluid source to the motor-pump for prerotating the wheel prior to landing, and means for selectively by-passing or restricting the motor-pump fluid displacement when being driven as a pump by the wheel after landing for operating the brake.

4. In combination with a hydraulic power transmission system for retracting and extending the landing wheel of an aircraft comprising means forming a source of pressure fluid including a tank and a fluid pump, a fluid motor for retracting and extending the landing wheel, and control valve means for selectively controlling the direction of operation of the motor, a fluid motor-pump unit connected in driving relation with the wheel, a fluid operated brake for the wheel connected to the outlet of the motor-pump unit, and hydraulically connected to the control valve for selectively connecting the pressure fluid source to the motor-pump unit and prerotating the wheel prior to landing, and means for selectively controlling the motor outlet for operating the wheel brake after landing.

5. In combination with a hydraulic power transmission system for retracting and extending the landing wheel of an aircraft comprising means forming a source of pressure fluid including a tank and a fluid pump, a fluid motor for retracting and extending the landing wheel, and control valve means for selectively controlling the direction of operation of the motor, a fluid motor-pump unit connected in driving relation with the wheel, a fluid operated brake for the wheel connected to the outlet of the motor-pump unit, and hydraulically connected to the control valve for selectively connecting the pressure fluid source to the motor-pump unit for prerotating the wheel prior to landing and for disconnecting the pump from the motor-pump unit after landing for causing the latter to operate as a pump, and means for selectively restrictively exhausting the fluid displacement of the motor pump unit when operating as a pump for operating the brake.

6. In combination with a hydraulic power transmission system for retracting and extending the landing wheel of an aircraft comprising means forming a source of pressure fluid including a tank and a fluid pump, a fluid motor for retracting and extending the landing wheel, and control valve means for selectively controlling the direction of operation of the motor, a fluid motor-pump unit connected in driving relation with the wheel, a fluid operated brake for the wheel connected to the outlet of the motor-pump unit, and hydraulically connected to the control valve for selectively connecting the pressure fluid source to the motor pump unit and prerotating the wheel prior to landing, means forming an exhaust line for the motor-pump unit also connected to the brake, and means for selectively restrictively exhausting the fluid displacement of the motor pump unit for operating the brake.

7. In combination with a hydraulic power transmission system for retracting and extending the landing wheel of an aircraft comprising means forming a source of pressure fluid including a tank and a fluid pump, a fluid motor for retracting and extending the landing wheel, and control valve means for selectively controlling the direction of operation of the motor, a fluid motor-pump unit connected in driving relation with the wheel, a fluid operated brake for the wheel connected to the outlet of the motor-pump unit, and hydraulically connected to the control valve for selectively connecting the pressure fluid source to the motor-pump unit and prerotating the wheel prior to landing, means forming an exhaust line for the motor-pump unit also connected to the brake, and a brake control valve connected to the exhaust line for selectively operating the brake.

8. In combination with a hydraulic power transmission system for retracting and extending the landing wheel of an aircraft comprising means forming a source of pressure fluid including a tank and a fluid pump, a fluid motor for retracting and extending the landing wheel, and control valve means for selectively controlling the direction of operation of the motor, a fluid motor-pump unit connected in driving relation with the wheel, and hydraulically connected to the control valve for selectively directing pressure fluid to the motor for extending the wheel and to the motor-pump unit for prerotating the wheel, a sequence valve for delaying the prerotating of the wheel until the wheel has been extended, a fluid operated brake for the wheel and a brake control valve connected to the outlet of the motor-pump unit for selectively applying the brake after landing.

9. In a hydraulic power transmission system for retracting and extending the landing wheels of an aircraft and for braking said wheels, that improvement which comprises a fluid motor-pump unit connected in driving relation with the wheel for prerotating the wheel prior to landing, and a single pressure supply line connected to the extending line of the landing wheel retracting and extending motor and to the inlet of the motor-pump unit.

10. In a hydraulic power transmission system for retracting and extending the landing wheels of an aircraft and for braking said wheels, that improvement which comprises a fluid motor-pump unit connected in driving relation with the wheel for prerotating the wheel prior to landing, a single pressure supply line connected to the extending line of the landing wheel retracting and extending motor and to the inlet of the motor-pump unit, and a sequence valve in the pressure supply line for delaying operation of the motor-pump unit to prerotate the wheel until the wheel has been extended.

11. In a hydraulic power transmission system for retracting and extending the landing wheels of an aircraft and for braking said wheels, that improvement which comprises a fluid motor-pump unit connected in driving relation with the wheel for prerotating the wheel prior to landing, a single pressure supply line connected to the extending line of the landing wheel retracting and extending motor and to the inlet of the motor-pump unit, and conduit means connecting the outlet of the motor-pump unit to the brake cylinder line for also operating the brake.

12. In combination with a hydraulic power transmission system for retracting, extending, and braking the landing wheels of an aircraft comprising a pressure fluid source including a reservoir and a fluid pump, a fluid motor for retracting and extending the landing wheel, a directional control valve for selective operation of the motor, a fluid operated brake for the wheel and a brake control valve for selective operation of the brake, a fluid motor-pump unit connected in driving relation with the wheel for prerotating the wheel prior to landing, and a single pressure supply line connected to the extending line of the landing wheel retracting and extending motor and to the inlet of the motor-pump unit.

13. In combination with a hydraulic power transmission system for retracting, extending, and braking the landing wheels of an aircraft comprising a pressure fluid source including a reservoir and a fluid pump, a fluid motor for retracting and extending the landing wheel, a directional control valve for selective operation of the motor, a fluid operated brake for the wheel and a brake control valve for selective operation of the brake, a fluid motor-pump unit connected in driving relation with the wheel for prerotating the wheel prior to landing, a single pressure supply line connected to the extending line of the landing wheel retracting and extending motor and to the inlet of the motor-pump unit, and a sequence valve in the pressure supply line for delaying operation of the motor-pump unit to prerotate the wheel until the wheel has been extended.

14. In combination with a hydraulic power transmission system for retracting, extending, and braking the landing wheels of an aircraft comprising a pressure fluid source including a reservoir and a fluid pump, a fluid motor for retracting and extending the landing wheel, a directional control valve for selective operation of the motor, a fluid operated brake for the wheel and a brake control valve for selective operation of the brake, a fluid motor-pump unit connected in driving relation with the wheel for prerotating the wheel prior to landing, a single pressure supply line connected to the extending line of the landing wheel retracting and extending motor and to the inlet of the motor-pump unit, and conduit means connecting the outlet of the motor-pump unit to the brake and to the brake control valve for selective operation of the brake.

FERRIS T. HARRINGTON.

REFERENCES CITED

The following references are of record in the file of this patent:

UNITED STATES PATENTS

| Number | Name | Date |
|---|---|---|
| 2,365,126 | Vickers | Dec. 12, 1944 |
| 2,381,842 | Schwend | Aug. 7, 1945 |